United States Patent [19]

Osawa

[11] Patent Number: 4,502,737
[45] Date of Patent: Mar. 5, 1985

[54] SLIDE WAY BEARING

[75] Inventor: Nobuyuki Osawa, Takasaki, Japan

[73] Assignee: Nippon Seiko Kabushiki Kaisha, Tokyo, Japan

[21] Appl. No.: 431,707

[22] Filed: Sep. 30, 1982

[30] Foreign Application Priority Data

Nov. 18, 1981 [JP] Japan .................... 56-170866[U]

[51] Int. Cl.³ ............................................ F16C 29/06
[52] U.S. Cl. ........................................................ 308/6 C
[58] Field of Search ............. 308/3 R, 3 A, 6 R, 6 A, 308/6 B, 6 C

[56] References Cited

U.S. PATENT DOCUMENTS

| 3,940,186 | 2/1976 | Nilsson | 308/6 C |
| 4,030,191 | 6/1977 | Ernst et al. | 308/6 C |
| 4,127,309 | 11/1978 | Teramachi | 308/6 C |
| 4,273,389 | 6/1981 | Takai | 308/6 C |
| 4,420,194 | 12/1983 | Asami | 308/6 C |

FOREIGN PATENT DOCUMENTS 2041155  9/1980  United Kingdom .............. 308/6 C

Primary Examiner—John Petrakes
Assistant Examiner—David Werner
Attorney, Agent, or Firm—Wyatt, Gerber, Shoup, Scobey & Badie

[57] ABSTRACT

A slide way bearing has a track shaft and a slide member to be slidably mounted on the track shaft. Track shaft has on its side surfaces first ball rolling grooves of circulation cross-section. Slide member has at its inner surface second ball rolling grooves corresponding to the grooves in the track shaft, and within the slide member through-holes at the back of the respective second grooves. The first and second grooves and through-holes form ball circulating paths. The intersecting points of lines of contact between the balls and the first ball rolling grooves are located outside of the polygon formed by connecting the centers of the balls. The circulating paths lies on the plane substantially parallel with the bottom surface of the track shaft.

8 Claims, 5 Drawing Figures

SLIDE WAY BEARING

BACKGROUND OF THE INVENTION

1. Field of the Invention

This invention relates to a bearing having many balls disposed between a track shaft and a slide member so that the slide member is linearly movable in the axial direction of the track shaft through the rolling movements of the balls.

2. Description of the Prior Art

It has been known to provide slide way bearings having many balls capable of circulating between an axial ball rolling groove formed at the track shaft and a ball rolling groove formed at the inner surface of the slide member at a position corresponding to the first mentioned groove. This type of slide way bearing is shown, for example, in U.S. Pat. Nos. 3,897,982 issued Aug. 5, 1975 to H. Teramachi and No. 3,938,854 issued Feb. 17, 1976 to H. Teramachi. Such slide way bearing has been advantageously used as a guide element for supporting a movable member in a machining apparatus or device, since the balls contact with the cylindrical recess of the ball rolling groove so that it was possible to enlarge the contact surface between the balls and the ball rolling groove which in turn leads to improve load bearing capacity compared to conventional linear ball bearings.

However, these slide way bearings of the prior art are low in supporting rigidity relative to a moment load, and when a large moment load is applied, balls tend to contact with the shoulder of the ball rolling groove so that smooth circulation of the balls is deteriorated.

Further, for obtaining a slide way bearing of high accuracy, it is necessary to precisely work the ball rolling groove. However, according to prior slide way bearings, it has been difficult to obtain a high accuracy in working each portion of the ball rolling groove due to its structure, or it was necessary to make the race way bearing bulky in height.

SUMMARY OF THE INVENTION

This invention provides a slide way bearing overcoming the defects of the prior art and presents a slide way bearing which is easy to manufacture.

For achieving said purposes, in accordance with a slide way bearing of this invention, intersecting points of contact lines of the ball rolling grooves in the track member with the balls fitted in the corresponding grooves locate outside of the polygon formed by connecting each central point of the balls, and the locations of the ball rolling grooves of the track member and of the through-hole formed through the slide member used as the return paths for the balls are in a plane parallel with the bottom surface of the track member.

DESCRIPTION OF THE PREFERRED EMBODIMENT

Referring to FIGS. 1 to 4, there is shown an embodiment of an improved slide way bearing according to the present invention.

Figure 1:
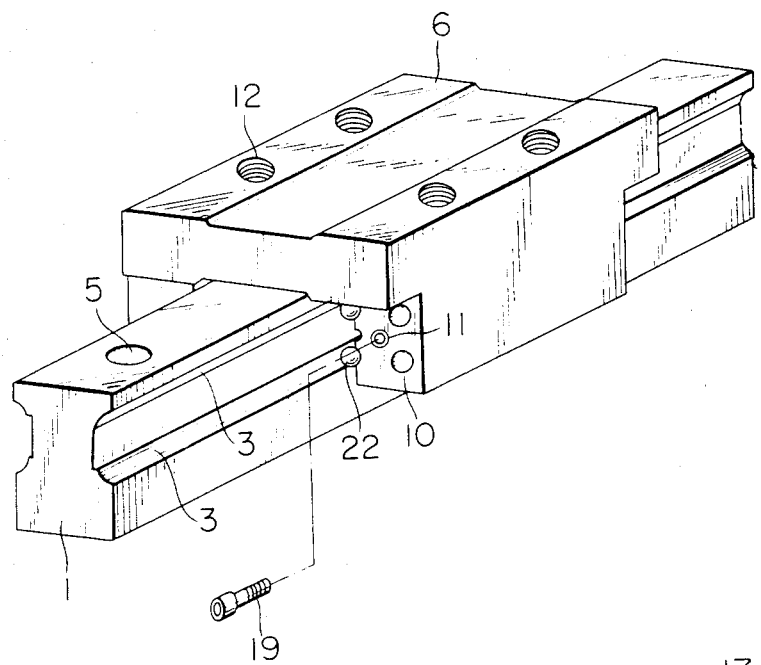
FIG. 1 shows a perspective view of a slide way bearing according to this invention.
Figure 2:
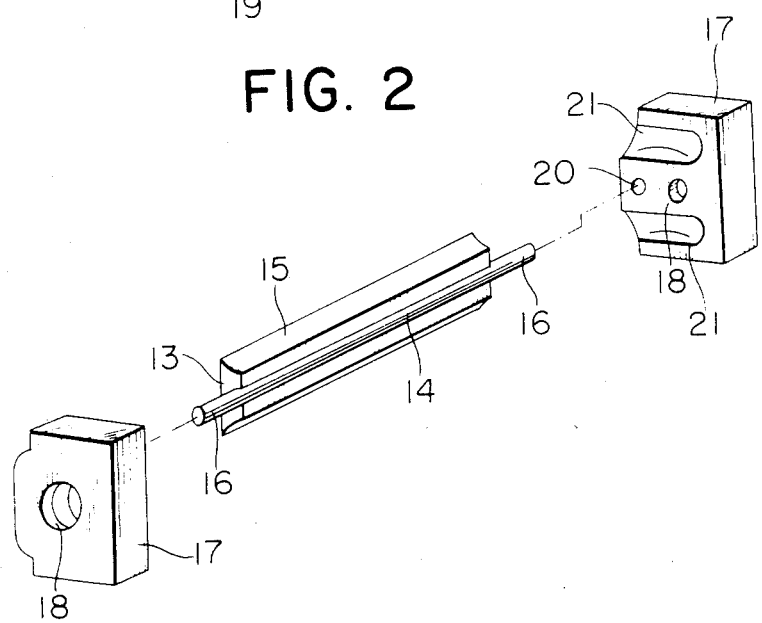
FIG. 2 shows a perspective view of the parts to be installed in the slide way bearing shown in FIG. 1.

Track shaft 1 is generally rectangular in cross section and has on both sides axial channels 2 of U-shape in cross section. Each of U-shaped channels 2 has respective ball rolling grooves 3 formed in its outer portions as shown in FIG. 1. The ball grooves 3 each have a circular cross-section. As shown in a transversal cross-section of the track shaft 1 in FIG. 3, each of the ball rolling grooves has a central bottom part 31. The axis line separating symmetrically the cross section of the groove 3 makes an angle of 45 degrees relative to the bottom surface 4 of the track shaft 1. Four axis lines separating symmetrically the four groove 3, respectively, are intersecting at the points a, b, c and d, which are outside of the rectangle formed by connecting the centers e, f, g and h of each circular recess formed by grooves 3 and 8 and receiving balls therein.

The hole 5 on the top surface of the track shaft 1 is to receive a bolt to fix the track shaft to another member when the slide way bearing is used. The slide member 6 is a rectangular block having a rectangular channel 7 (FIG. 3) receiving the track shaft 1, and at the inner side surfaces of the channel 7, the axial ball rolling grooves 8 are provided corresponding to the ball rolling grooves 3 of the track shaft. In this embodiment shown in the drawing, each of two lines of the ball rolling grooves 8 are provided on each side surface of the channel 7 so that in total four lines of the grooves 8 are provided. At the side surface of the channel 7, there is a small circular cross-section groove 9 disposed between two ball rolling grooves 8 and 8. Four axial through-holes 10 are formed in the slide member 6 corresponding to the four ball rolling grooves 8, and the diameter of the through-holes 10 is a little larger than the diameter of the ball rolling groove 8.

The location of each through-hole 10 is behind the corresponding groove 8, and the plane including the center line of the through-holes 10 and the plane including the center line of the arcuate recess of the corresponding ball rolling groove 8 are parallel with each other and when the slide way bearing is used to lay the bottom surface 4 of the track shaft 1 horizontal, said planes become horizontal.

The axial end surface of the slide member 6 is so formed that the side of the channel 7 is cut off by a predetermined amount (FIG. 1), and within this cut off surface, screw hole 11 is formed in parallel with the through-hole 10. The screw hole 12 provided at the top surface of the slide member 6 is used, when the slide way bearing is in use, to fix the slide member to the other member.

The retainer 13 is a thin plate member having at its back a projecting rod 14 fitting within the groove 9 having circular cross section formed between the ball rolling grooves 8 and 8 of the slide member 6. The length of the thin plate member is equal to the length of the groove 8 of the slide member and at the longitudinal side surfaces, concave surfaces 15 are formed. The projecting rod 14 extends in longitudinal direction beyond both edges of the thin plate member 13 as shown at 16.

Each of the side plates 17 is fixed at the cut off end part of the slide member 6 by the bolt 19 inserted into the hole 18 and threaded to the screw hole 11. The thickness of side plates 17 is slightly less than the depth of the cut off part of the slide member 6 so that the side plates 17 are fixed slightly inside of the end surfaces of the slide member 6.

On the surface of the side plate 17 abutting the slide member, the hole 20 receiving the projected part 16 of the rod 14 and the circular recess 21, which forms the circular ball path together with the groove 8 and the through-hole 10, are provided.

The projecting rod 14 of the retainer 13 is fitted in the groove 9 formed at the inner surface of the slide member 6 and the projected part 16 of the rod 14 is fitted in the hole 20 so that the retainer 13 is fixed by fixing the side plates 17 to the slide member 6 by the bolt 18.

Many balls 22 are disposed in the ball circulating paths formed by between the grooves 8 and the grooves 3 and between the through-hole 10 and the recesses 21 of the side plates, thus the slide member 6 and the track shaft 1 are relatively movable in the axial direction through the aid of the rolling of the balls.

When the slide member 6 moves on the track shaft, balls 22 roll and move along the ball rolling groove 8 of the slide member, and at the end of the groove 8, balls are guided backwardly by the recess 21 of the side plate 17 and enter into the through-hole 10 and pass toward the opposite side plate 17 and again enter into the ball rolling grooves 3 and 8 through the recess 21. Thus the balls repeat the circulating movements as the slide member moves on the track shaft.

The ball 22 fitted in the ball rolling groove 8 of the slide member 6 are not dropped away when the track shaft 1 is removed from the slide member 6, since the clearance between the ball rolling groove 8 and the edge of the recessed surface 15 of the retainer 13 is little smaller than the diameter of the ball. Such retention of the ball will make it possible to form the ball rolling grooves as deep grooves.

In the illustrative embodiment, four side plates 17 are used, however, two side plates 17 installed at one end of the slide member 6 can be made as an integral side plate 17 combining two side plates 17. Further in case of using the slide member without removing it from the track shaft it is possible to omit the retainer 13. And in the illustrative embodiment, the balls are circulated along the horizontal plane, but it is possible to modify it to make the circulation along substantially horizontal plane and also it is not necessary to limit the angle formed between the contact line of the ball with the groove and the bottom surface of the track shaft as 45 degrees.

Figure 3:
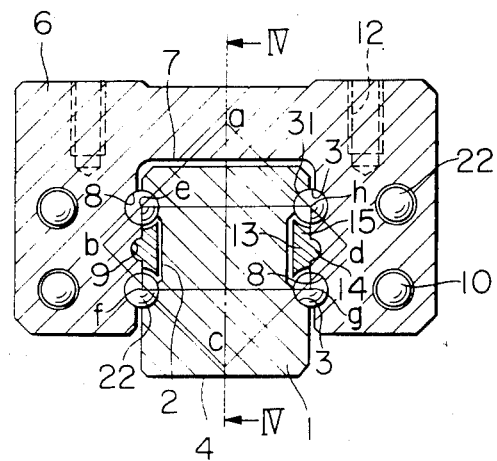
FIG. 3 shows a transversal cross section of the slide way bearing of FIG. 1.
Figure 4:
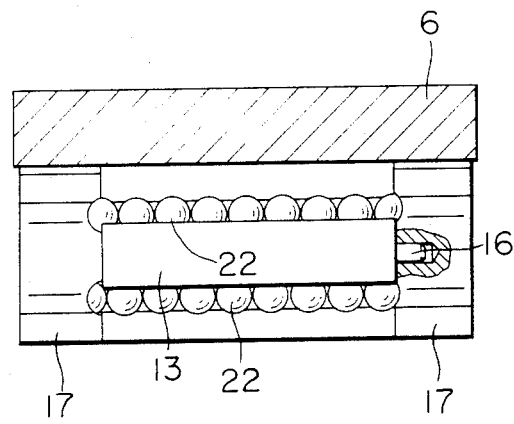
FIG. 4 shows a cross section taking along the line IV—IV in FIG. 3, and in FIG. 4, the track shaft is omitted.
Figure 5:
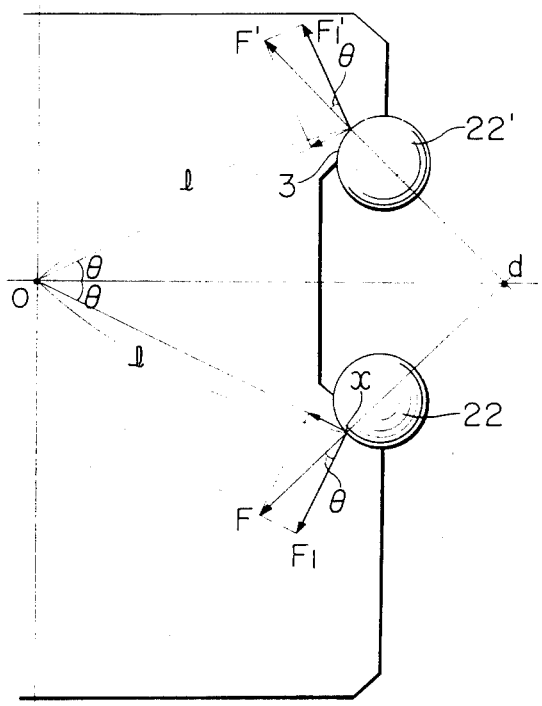
FIG. 5 illustrates the supporting rigidity of the bearing of this invention.

In accordance with the slide way bearing of this invention, the ball rolling grooves are made deep grooves, the intersecting points a, b, c and d of the contact lines of the balls contacting with the ball rolling grooves of the track shaft in the transversed cross section are located outside of the polygon connecting the central points e, f, g and h of each ball 22 as shown in FIG. 3, and the balls are circulatingly movable within the planes substantially parallel with the bottom surface of the track shaft. Consequently the supporting rigidity against the moment load is large and the circulation of the balls is smooth since no bad effect of the gravity is applied to the circulation resistance of the balls so that a compact slide way bearing having a good actuating characteristic is obtained. Here the supporting rigidity against the moment load is explained referring to FIG. 5, in which d is an intersecting point of the contact lines of balls 22 and 22' with the groove 3 of the track shaft, the point o is the point where the positive and negative moments are made equal. The angle formed between the lines $\overline{od}$ and $\overline{ox}$ is made $\theta$, and the force F is applied along the direction of $\overline{dx}$, the supporting rigidity is calculated on the basis of $M = l \cdot F \cdot \cos \theta$.

And therefore, if F is assumed as the same, then the supporting rigidity becomes larger when the length l of the arm $\overline{ox}$ is longer. In the slide way bearing disclosed in U.S. Pat. No. 4,040,679 issued Aug. 9, 1977 to H. Teramachi, in which a pair of ball rolling grooves are provided at the shoulder portions of the track shaft, it is apparent that the length of the arm formed between the point where the negative and positive moments are equal and the contacting point of the balls with the grooves formed at the shoulder of the track shaft is shorter than the present invention. In comparing these two cases using the track shafts of substantially the same dimension, the slide way bearing of this invention has the moment load supporting capacity two times or more than that obtainable by the structure of U.S. Pat. No. 4,040,679.

Further, according to this invention, it is easy to machine the ball rolling grooves with high accuracy and easy to measure the precision degree of the grooves so that it is easy to manufacture a high accuracy slide way bearing.

Further, according to this invention, it is possible to work simultaneously two ball rolling grooves on one side surface of the track shaft by using a single abrasive wheel having circular edges, and two ball rolling grooves of the slide member can also be worked simultaneously using a single abrasive wheel so that all of the ball rolling grooves are easily manufactured with high accuracy. Since the circulation paths of the balls are provided in parallel with the bottom surface of the track shaft it is possible to make the pitch between upper and lower grooves small, and unevenness of the work due to the deflection of the abrasive wheel can be avoided. As shown in FIG. 3, each of the ball rolling grooves has the bottom part 31 perpendicular, in transversal cross section of the track shaft 1, to the line parallel with the bottom surface of the track shaft, it is easy to measure the degree of parallel of the ball rolling grooves.

Moreover, since the circulation of the balls is made within the horizontal plane, it is possible to reduce the height of the slide member which in turn reduce the effect of the eccentric application of the external load.

I claim:

1. A slide way bearing comprising
a track shaft having substantially planar bottom surface, opposite side surfaces and a top surface, the opposite side surfaces of the track shaft being formed with respective channels opposite to each other and extended in the longitudinal direction of the shaft, each channel being formed at its ends with respective first ball rolling grooves,
a slide member slidably mounted on the track shaft, the slide member having side portions which have opposite side surfaces opposed to the respective side surfaces of the track shaft and a top portion connecting the opposite side portions, each side surface of the slide member being formed with second ball rolling grooves opposed to the first ball rolling grooves of the track shaft, the slide member being formed with through-holes extended behind the second ball rolling grooves and lying in a plane therewith parallel with the bottom surface of the track shaft, side plates fixed to the respective ends of each side portion of the slide member, each side plate being formed with means including grooves interconnecting the second grooves and the corresponding through-holes to form ball circulating paths together with the through-holes, a plurality of balls disposed between the first and second grooves and in the circulating paths, and the ends of the top portion of the slide member being slightly more extended in the longitudinal direction of the track shaft than the respective ends of the side plates.

2. A slide way bearing comprising:

a track shaft of a unitary structure having a top surface, a planar bottom surface and opposite planar side surfaces, the opposite planer side surfaces being formed with respective first ball rolling grooves;

a slide member formed with a recess to be mounted on the track shaft, the recess having a bottom opposed to said top surface of the track shaft and planar side surfaces opposed to the respective planar side surfaces of the track shaft, the slide member having at each side surface second ball rolling groove provided in correspondence with the first ball rolling grooves and having a through-hole formed through the slide member correspondingly behind each second ball rolling groove so as to form ball circulating paths, the slide member being formed with an axially extended groove in each side surface of the recess;

means including a respective retainer engaging each said side surface of the slide member for retaining the balls in the respective second ball rolling grooves in the slide member;

a plurality of side plates fixed to each axial end of the slide member and each having a recess interconnecting respective ball rolling grooves and an associated through-hole to form cylindrical ball circulating paths;

a plurality of balls disposed in the first and second ball rolling grooves; and said retainers each being provided with an axially extended projecting portion adapted to fit in an axially extended groove of a respective slide member, each retainer being supported at its ends by respective side plates.

3. A slide way bearing according to claim 2, wherein the through-holes within the slide member forming the circulating paths for balls together with the corresponding grooves lie on a plane substantially parallel with the bottom surface of the track shaft.

4. A slide way bearing according to claim 2, wherein said retainer has at each end thereof a projecting rod extended axially, the retainer being connected with said side plates by said projecting rods fitting within respective openings in said side plates.

5. A slide way bearing according to claim 2, wherein each retainer has a concave surface for retaining balls.

6. A slide way bearing according to claim 5, wherein clearance formed between an edge of the second ball rolling groove and an edge of the corresponding concave surface of each retainer is little smaller than the diameter of the balls.

7. A slide way bearing comprises:

a track shaft of a unitary structure having a bottom, opposite side surfaces and a top, the opposite side surfaces being formed with respective first ball rolling grooves;

a slide member formed with a recess to be mounted on the track shaft, the recess having a bottom opposed to said top and side surfaces opposed to the respective side surfaces of the track shaft, the slide member having at each side surface second ball rolling grooves provided in correspondence with the first ball rolling grooves and having a through-hole formed through the slide member correspondingly behind each second groove so as to form ball circulating paths, the slide member being formed with an axial groove in each side surface of the recess;

means including a respective retainer engaging each said respective side surface of the slide member for retaining the balls in the respective second ball rolling grooves in the slide member;

a plurality of side plates fixed to each axial end of the slide member and each having a recess interconnecting respective ball rolling grooves and an associated through-hole to form cylindrical ball circulating paths;

a plurality of balls disposed in the first and second ball rolling grooves;

said retainers each being provided with an axially extended projecting portion adapted to fit in an axially extended recess of a respective slide member, each retainer being supported at its ends by respective side plates.

8. A slide way bearing according to claim 7, wherein said retainer has at each end thereof a projecting rod extended axially, the retainer being connected with said side plates by said projecting rods fitting within respective openings in said side plates.

* * * * *